United States Patent

Metzger

(10) Patent No.: US 10,012,736 B2
(45) Date of Patent: Jul. 3, 2018

(54) SYSTEM AND PROCESS OF DETERMINING VEHICLE ATTITUDE

(71) Applicant: LOCKHEED MARTIN CORPORATION, Bethesda, MD (US)

(72) Inventor: Thomas R. Metzger, North Tonawanda, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 862 days.

(21) Appl. No.: 14/205,517

(22) Filed: Mar. 12, 2014

(65) Prior Publication Data

US 2014/0266882 A1     Sep. 18, 2014

Related U.S. Application Data

(60) Provisional application No. 61/777,902, filed on Mar. 12, 2013.

(51) Int. Cl.
| | |
|---|---|
| *G01S 19/21* | (2010.01) |
| *G01S 19/53* | (2010.01) |
| *G01S 19/22* | (2010.01) |
| *G01S 19/36* | (2010.01) |
| *G01S 3/28* | (2006.01) |

(52) U.S. Cl.
CPC .............. *G01S 19/21* (2013.01); *G01S 19/22* (2013.01); *G01S 19/53* (2013.01); *G01S 3/28* (2013.01); *G01S 19/215* (2013.01); *G01S 19/36* (2013.01)

(58) Field of Classification Search
CPC .......... G01S 19/53; G01S 19/54; G01S 19/55; G01S 19/21

USPC ............. 342/357.59, 357.21, 357.36, 357.51
See application file for complete search history.

(56) References Cited

U.S. PATENT DOCUMENTS

| 4,197,542 A * | 4/1980 | Hofgen ..................... G01S 3/10 342/398 |
| 6,005,514 A * | 12/1999 | Lightsey ................ G01S 19/55 244/171 |
| 7,733,288 B2 * | 6/2010 | Williams ............... H01Q 1/526 342/368 |
| 2003/0078705 A1 * | 4/2003 | Kumar ..................... G01S 19/36 701/13 |
| 2008/0068263 A1 * | 3/2008 | Tekawy .................. G01S 19/53 342/357.36 |

(Continued)

OTHER PUBLICATIONS

International Search Report and Written Opinion for International Application No. PCT/US2014/024016, dated Jun. 25, 2014, 10 pgs.

*Primary Examiner* — Dao L Phan
(74) *Attorney, Agent, or Firm* — Hamre, Schumann, Mueller & Larson, P.C.

(57) ABSTRACT

A system and process that can be used to determine vehicle attitude with only one navigation receiver. In one embodiment, the antenna of the navigation receiver is driven with a signal that modulates sensitivity in azimuth. The received navigation signal strength is demodulated by the phase at which the antenna is sweeping and a phase angle and a magnitude for the incoming signal are calculated. Using this calculated phase angle, magnitude and antenna characteristics, the location of the user (i.e. the navigation receiver) and the location of the navigation satellite, the attitude of the antenna and hence the user or user vehicle can be determined.

10 Claims, 4 Drawing Sheets

(56) References Cited

U.S. PATENT DOCUMENTS

| | | | |
|---|---|---|---|
| 2008/0291079 A1* | 11/2008 | Chang | G01S 19/21 |
| | | | 342/174 |
| 2010/0169006 A1* | 7/2010 | Ueda | G01S 19/49 |
| | | | 701/505 |
| 2010/0195550 A1* | 8/2010 | Nakano | H04B 1/0007 |
| | | | 370/311 |
| 2011/0068973 A1* | 3/2011 | Humphreys | G01S 19/215 |
| | | | 342/357.3 |

* cited by examiner

SYSTEM AND PROCESS OF DETERMINING VEHICLE ATTITUDE

FIELD

This disclosure relates to determining vehicle attitude using GPS, Global Navigation Satellite System (GNSS) or other satellite navigation system.

BACKGROUND

Prior solutions to determining vehicle attitude using GPS have required two or more antenna/receiver combinations. Small devices such as micro-unmanned aerial vehicles (UAV's), personal navigators, cellular telephones and other small vehicles lack the dimensions required to host traditional multiple antenna attitude determination systems.

In addition to attitude determination, multiple antenna systems have been used to detect spoofing by computing the direction of the incoming satellite navigation signal.

In safety critical applications, such as Positive Train Control (PTC) systems, the attitude of the locomotive on track is critical to locate the train. Attitude computed directly from each antenna of a multiple antenna system creates an additional input to check correctness of other calculations.

SUMMARY

A system and process are described that can be used to determine vehicle attitude with only one GPS, GNSS or the like antenna/receiver. The system and process can be employed to determine attitude of any vehicle or person including, but not limited to, unmanned aerial vehicles, manned aircraft, ground vehicles, trains, water-borne vehicles, individuals with hand-carried GPS, GNSS or like receivers, and the like. The described system and methods can be implemented with only one antenna and therefore enables attitude determination on smaller vehicles and/or vehicles that lack the dimensions suitable to host a traditional multiple antenna attitude determination system.

In one non-limiting exemplary embodiment, the antenna of the GPS, GNSS or like receiver is driven with a signal that modulates sensitivity in azimuth. The received signal strength is demodulated by the phase at which the antenna is sweeping, and a phase angle and a magnitude for the incoming signal are calculated. Using this calculated phase angle, magnitude and antenna characteristics, the location of the user (i.e. the receiver) and the location of the GPS, GNSS or like satellite, the attitude of the antenna and hence the user or user vehicle can be determined.

Using one satellite in the process will provide a rough estimate of vehicle attitude. The more satellites used in the process, the more accurate the calculated attitude.

The system and process described herein can be used with any satellite navigation system including, but not limited to, GPS, GNSS or the like, that uses at least one navigation satellite that transmits signals that can be received by a suitable navigation receiver used on earth, on land, in air or underwater, for navigation. The navigation satellite(s) can be referred to generically as a GPS satellite(s) or the like. Signals from the navigation satellite are received by a navigation antenna/receiver (or navigation transceiver) that can also be referred to generically as a GPS antenna/receiver.

In another non-limiting exemplary embodiment, if certain signals are coming from the wrong angle, or they are all coming from the same angle, multipath error can be rejected or it can be concluded that the receiver is being "spoofed." This spoofing detection can be implemented using a single antenna instead of the multiple antenna systems previously used.

In another non-limiting exemplary embodiment, if an antenna array is used, jamming signals coming from the same angle will only impact the incoming antenna pointed at the incoming angle while other antennas still receive valid signal measurements forming an anti jamming capability.

In another non-limiting exemplary embodiment, in a land vehicle where the vehicle is known to be local level given vehicle characteristics and/or aided by an embedded Inertial Measurement Unit (IMU), only the phase angle may be required in the process in order to determine attitude.

In another non-limiting exemplary embodiment, a static antenna pattern formed from multiple aimed receivers/antennas and absolute signal strength could be used to determine attitude.

In another non-limiting exemplary embodiment, an active ray-dome with active controllable interference characteristics could be used to modulate the satellite signal. This implementation could use smart materials that are given a stimulus, such as electrical current, to change the local RF transmission resistance of the dome. Physical blockages such as rotating RF shields could also be used.

In another non-limiting exemplary embodiment, complex interference patterns could be used to better estimate elevation. This implementation could include a high frequency interference pattern that only impacts (or impacts proportionally) signals at a certain elevation. In addition, any number of new modulation frequencies and variable magnitudes, possibly arranged non-linearly, could be added to the input pattern and used to better compute azimuth and elevation. This modulation frequency loop could be made active such as modulating a high frequency with shaped magnitude (ramp up/ramp down) at the expected GPS signal incoming azimuth. Multiple passes could be used to find the maximum signal strength and then essentially track the navigation satellite through the sky using this method. Each navigation satellite could be given a unique frequency to allow implementation of this technique across multiple navigation satellites.

In another non-limiting exemplary embodiment, active noise elements could be used that modulate Signal to Noise ratio (S/N) rather than signal strength (SS). Because noise is the denominator to signal, the S/N modulation would appear the same as a SS modulation and could be substituted for signal strength.

In another non-limiting exemplary embodiment, the physical structure of the vehicle could be used to purposely create interference patterns that are then used to provide estimates of attitude based on computed interference pattern and the resultant experienced signal modulation.

DRAWINGS

DETAILED DESCRIPTION

Figure 1:
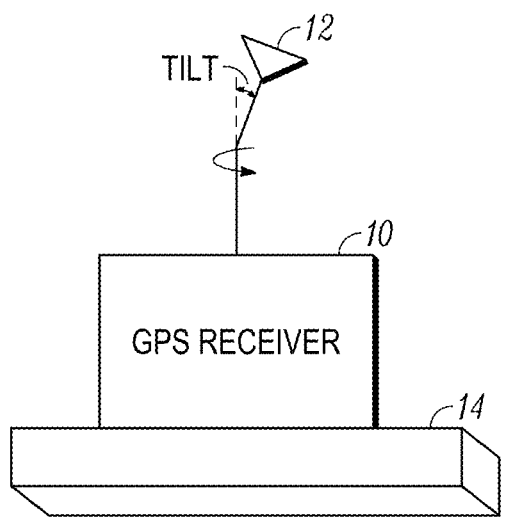
FIG. 1 illustrates a navigation receiver on a user or user vehicle showing azimuth sweeping of the receiver antenna.

With reference initially to FIG. 1, a navigation receiver 10 (also known as a GPS receiver) with an antenna 12 is illustrated. For example, the navigation receiver 10 can be carried by a local level vehicle represented schematically at 14. The single navigation receiver 10 is used to determine the vehicle forward direction attitude θ (i.e. the angular orientation of the vehicle with respect to a vector pointing up with respect to the surface of the earth).

Figure 2:
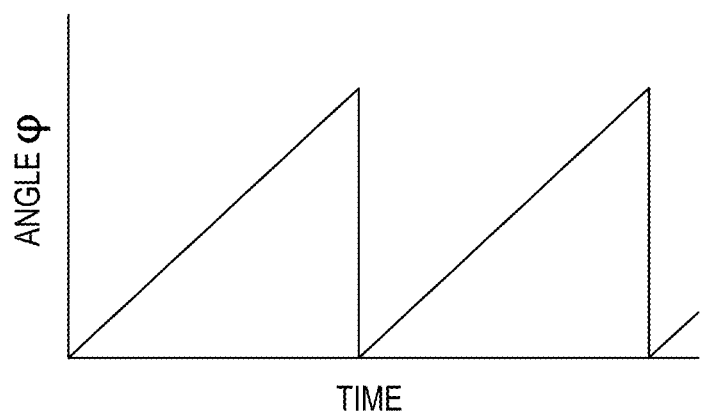
FIG. 2 illustrates a plot of antenna angle $\varphi$ versus time.

Turning to FIG. 2, a first step in the process is to drive the antenna 12 of the navigation receiver 10 with a signal that modulates sensitivity in azimuth φ as indicated by the arrow in FIG. 1. FIG. 2 plots 0 to 360 degrees antenna angle φ at frequency f. In one example, the navigation receiver 10 can be located in a ground vehicle where 0 degrees antenna angle is equal to the maximum signal strength toward the front of the vehicle. The antenna sensitivity can be swept in azimuth either by mechanical or electronic means.

In another non-limiting exemplary embodiment, instead of sweeping a single antenna, multiple static antennas or an antenna with multiple static elements could be used.

Figure 3:
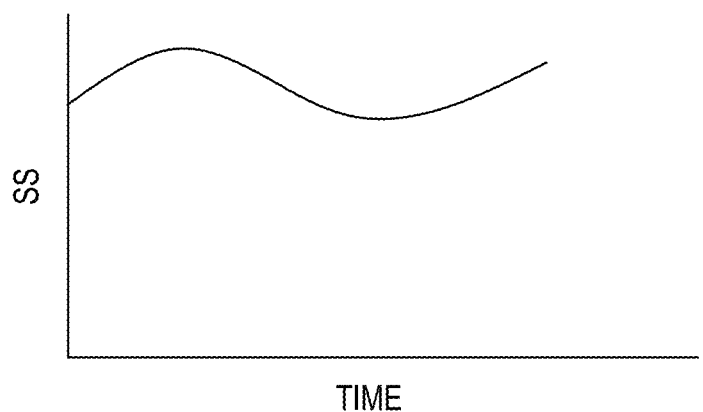
FIG. 3 illustrates a plot of signal strength versus time.

As shown in FIG. 3, the received signal strength (SS) from each navigation satellite (also known as a GPS satellite) has a sinusoidal signature (for satellites not directly overhead). For each navigation satellite, the SS has a frequency fat phase angle equal to α (i.e. the direction of the incoming signal) with respect to the vehicle. The vehicle forward direction attitude θ (FIG. 5) can be computed based on the vehicle and navigation satellite location using known methods.

Figure 4:
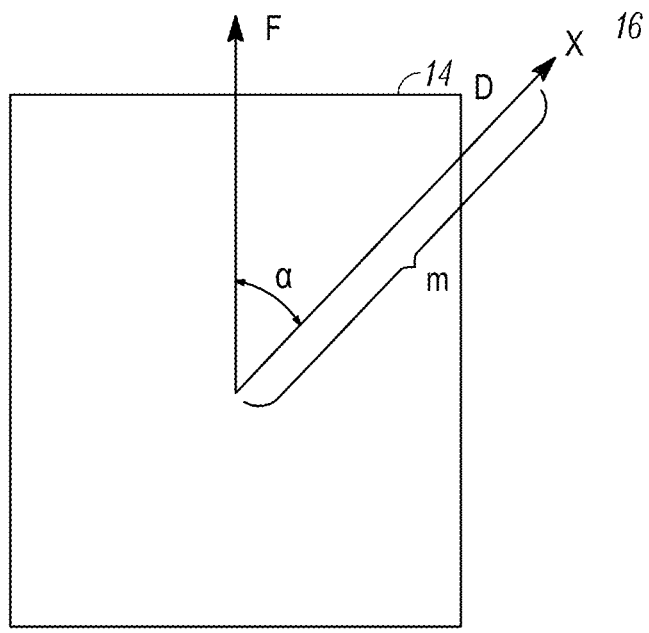
FIG. 4 is a top view of a vehicle illustrating phase angle and magnitude.

Next, the received navigation signal strength is demodulated by the phase at which the antenna 12 is sweeping and a phase angle α for the incoming signal is calculated. With reference to FIG. 4, the phase angle α is the angle (i.e. the direction of the incoming signal with respect to the vehicle) where the signal strength SS from the navigation satellite 16 is maximum. The vector D indicates the vector direction of the navigation satellite 16 while the vector F points forward through the front end of the vehicle 14. The magnitude m of the SS is the amplitude of the received navigation signal at the phase angle α and gives a measure of azimuth.

Figure 5:
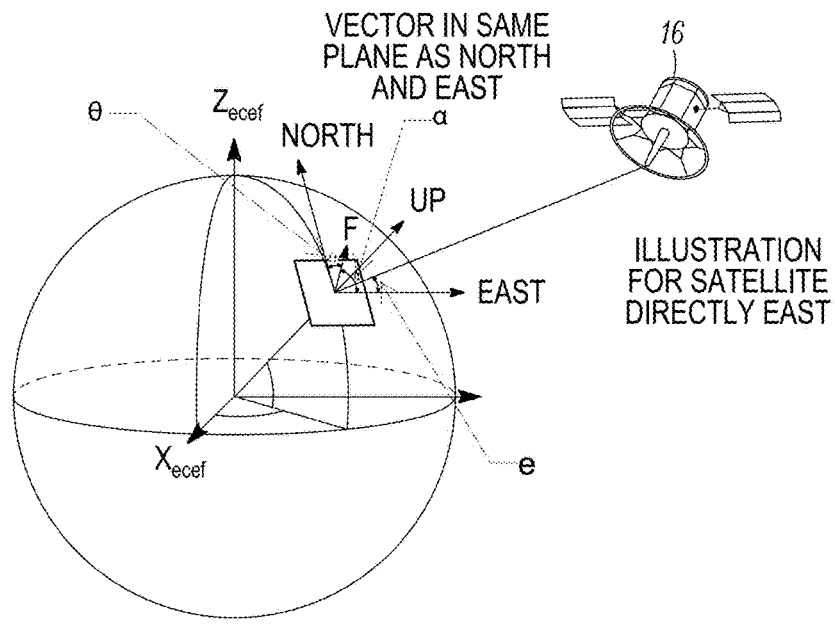
FIG. 5 illustrates a navigation satellite relative to earth and determining vehicle attitude.

With reference to FIG. 5, using the determined phase angle α, the location of the vehicle 14 (i.e. known from the navigation receiver 10) and the location/position of the navigation satellite 16, the attitude of the antenna 12 and hence the vehicle 14 forward direction attitude θ is determined.

I. Non-Limiting Exemplary Calculation of Vehicle Attitude

The following non-limiting example shows how to determine vehicle attitude from a single navigation receiver. Other examples and techniques are possible.

Given:
g=antenna gain
e=elevation of incoming signal with respect to the vehicle
α=azimuth or direction of the incoming signal with respect to the vehicle
em=elevation of incoming signal with respect to the antenna
tilt=antenna tilt angle (virtual or otherwise) with respect to the vehicle level
w=angular rate of antenna sensitivity rotation
t=time
SS=signal strength Assuming an antenna with linear gain characteristics between zero degrees elevation and 90 degrees (this assumption does not limit the validity of the technique described herein).

$$g = em/90 \quad \text{(equation 1)}$$

Rotating the antenna gain characteristics at rate w at a fixed antenna tilt angle as shown in FIG. 1, the resultant incoming elevation angle with respect to the antenna can be determined as follows:

$$em = e + tilt*\sin(w*t+\alpha) \quad \text{(equation 2)}$$

For convenience, assume a gain of one equals a SS of one and substitute in for the antenna gain equation (this assumption does not limit the validity of the technique described herein):

$$SS = (e + tilt*\sin(w*t+\alpha))/90 \quad \text{(equation 3)}$$

The resultant SS appears as the modulated signal shown in FIG. 3. In practice, α is unknown when the vehicle attitude is unknown. Therefore, the azimuth or phase angle estimate can be computed over one antenna cycle as follows:

$$\alpha = a\tan(\text{mean}(ss*\cos(w*t))/\text{mean}(ss*\sin(w*t))) \quad \text{(equation 4)}$$

In practice, elevation is unknown when the vehicle attitude is unknown, therefore the elevation estimate can be computed, if the expected in space signal strength can be estimated, as:

$$el\_est = \text{mean}(ss)*90 \quad \text{(equation 5)}$$

In the exemplary case of an airborne environment, effects such as atmospheric delay can be overcome using, for example, a high pass matching filter, especially in the case of a high dynamic environment.

The averaging time can be extended over multiple cycles depending on modulation frequency, observed noise, vehicle dynamic characteristics or other reasons.

Using known methods, taking into account the absolute position of the vehicle and the position of the navigation satellite, an estimate can be computed for the vehicle forward direction attitude θ for inclusion into the navigation filter.

In the case of multiple navigation satellites, using known methods, taking into account the absolute position of the vehicle, the positions of the navigation satellites, and taking multiple measurements from the multiple navigation satellites, the absolute attitude θ can be solved using a least squares implementation.

In the case of a locomotive, known to be local level to the earth, a course attitude θ A can be computed from one navigation satellite. Using multiple satellites, the consistency between each satellite observation can be used to give confidence in the computed attitude θ.

In the above example, if the elevation of the satellite is greater than 90 degrees minus tilt angle, the SS signal will invert. This can be captured by monitoring the magnitude m of the SS, the computed elevation or comparing with other satellite observations.

In an alternate embodiment, the vehicle can include a static antenna pattern or array formed from multiple aimed antenna/receivers, or each antenna could utilize a single navigation receiver. Absolute signal magnitude m measured directly from each antenna could be used to determine attitude.

II. Non-Limiting Exemplary Calculation Using a Static Antenna Pattern

The following non-limiting example shows how to determine vehicle attitude from a static antenna pattern. Other examples and techniques are possible.

In this example, a static antenna pattern on a local level vehicle can be used with each antenna having unity gain in elevation but linear gain pattern in azimuth from zero gain at zero degrees, one at 90 degrees and zero again at 180 degrees. Aligning four of these antennas perpendicular to the horizon each at 90 degree azimuth angle from each other will create an array capable of determining attitude for a ground based vehicle including, but not limited to, a locomotive. In this example, antenna 1 is pointed forward, antenna 2 pointed to the right, antenna 3 pointed aft, and antenna 4 point left. The following equations can be used to compute a vehicle azimuth observation.

The navigation satellite signal not directly overhead will only be received by two of the four antennas.

If the navigation signal is received by antenna 1 and antenna 2, the azimuth can be computed by:

$\alpha$=azimuth of incoming signal with respect to the vehicle
ss1=signal strength from antenna 1
ss2=signal strength from antenna 2
g1=gain of antenna 1
g2=gain of antenna 2

Since the signal is only received by antenna 1 and antenna 2, the measurement is coming from the quadrant where an increase in $\alpha$ results in a gain that is decreasing for antenna 1 and the gain is increasing for antenna 2.

$$g1=(90-\alpha)/90$$

$$g2=\alpha/90 \quad \text{(equation 6)}$$

Taking the ratio and solving for $\alpha$:

$$\alpha=90/(1+(g1/g2)) \quad \text{(equation 7)}$$

The signal in space is the same for both antennas and attenuated per the antenna gain, so the gains can be replaced with SS.

$$\alpha=90/(1+(ss1/ss2)) \quad \text{(equation 8)}$$

In practice, $\alpha$ is the unknown when the vehicle attitude is unknown therefore equation 8 is used to compute the estimated incoming signal azimuth with respect to the vehicle which provides a measure of vehicle attitude.

Each angular quadrant will have unique equations to determine the azimuth observation. Therefore, the algorithm will determine which quadrant the signals are coming from prior to computing azimuth. In practice, an antenna will not have an ideal linear relationship between azimuth and gain. Therefore, lookup tables or fitted equations can be used to compute the gains for each antenna, or similarly a representation that takes the ratio of SS's and computes an angle. This relationship can be calibrated for an antenna array.

Any number of antennas pointed in any number of directions can be used to more finely determine the incoming signal direction. The antennas can share a single navigation receiver, or each antenna can have a dedicated navigation receiver channel depending on how many navigation satellites would be visible given the antenna field of view.

An advantage of this implementation is that the navigation antenna gain pattern can be focused to increase gain given a narrower antenna pattern. This allows better low signal strength reception.

Another advantage of this implementation is that the set-up would have anti-jam characteristics because the navigation receiver antenna would reject interference from signal sources that are not on the direct line (e.g. within the narrow navigation antenna pattern) between the vehicle and the navigation satellite. For example, an unmanned aerial vehicle (UAV) being jammed from the forward direction would only lose navigation signals arriving from the front of the vehicle. Navigation measurements from the sides and rear of the vehicle would still be valid allowing uninterrupted navigation.

In addition to determining attitude, the described process can also be used to determine error conditions such as multipath or spoofing. For example, if one or more navigation signals are coming from the wrong angle (e.g. one navigation signal does not agree with others), that can indicate a possible multipath condition. In addition, if all of the navigation signals are coming from the same phase angle $\alpha$, that can indicate possible spoofing.

Figure 6:
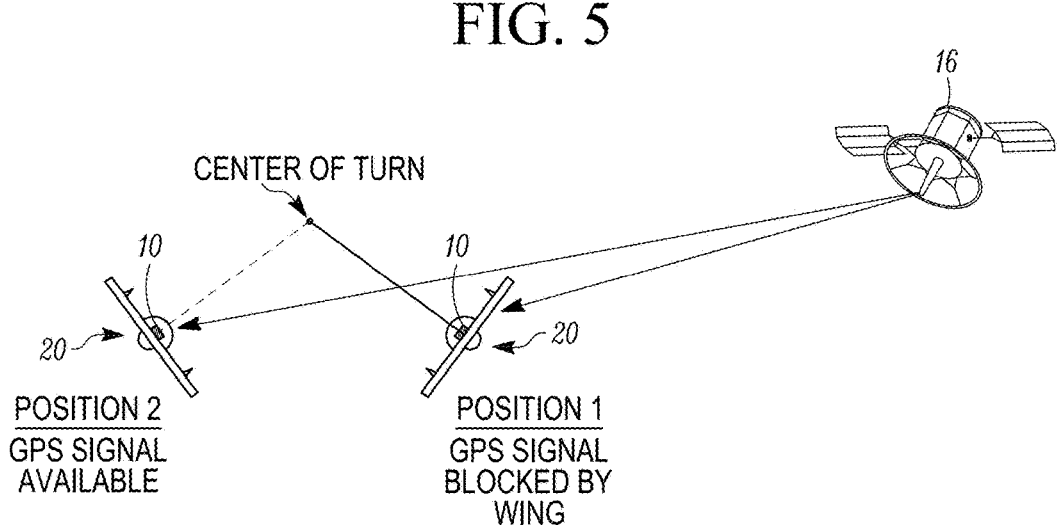
FIG. 6 illustrates an aerial vehicle creating an interference pattern to estimate attitude.

FIG. 6 illustrates another embodiment for determining or estimating attitude where in this example a UAV 20 is used to purposefully introduce a signal blockage using the physical structure of the UAV. At position 1 shown in FIG. 6, the navigation signal is blocked by the wing or other structure of the UAV. A purposeful circular bank or turn of the UAV is then commanded to position 2 where the navigation signal can be received by the navigation receiver 10 on the UAV.

Figure 7:
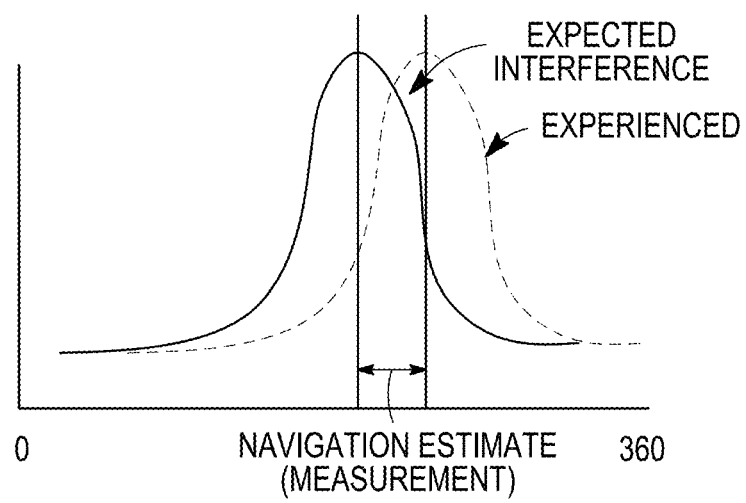
FIG. 7 illustrates how to estimate attitude from the technique in FIG. 6.

FIG. 7 shows a plot of the expected interference pattern (in solid line) versus the interference pattern actually experienced (in dashed line). The expected interference pattern(s) is stored in a look-up table in memory on the UAV or elsewhere and the interference pattern(s) can be one or more predetermined pattern(s) based on UAV structure and the orientation of the UAV. The actual interference pattern can then be compared against the expected pattern(s) in the look-up table to find the correct orientation. The difference between the expected interference versus the actual experienced interference provides an estimate of the attitude of the UAV. The difference can be calculated by any suitable calculation technique such as best fit or demodulation. The closer the match between the expected interference and the actual experienced interference, the more accurate the determined vehicle attitude.

So the embodiment in FIGS. 6 and 7 uses the wing of the UAV 20 as the interference pattern between the navigation satellite 16 and the fixed UAV antenna 12. This method could be used at any time including, but not limited to, during periods where other magnetic and inertial sensors of the UAV 20 are being calibrated or in other various failure scenarios of UAV systems.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A process of determining vehicle attitude using one or more navigation satellites, comprising:
    modulating the sensitivity of a single antenna of a single Global Positioning System (GPS) receiver in azimuth;
    using the GPS receiver to receive a navigation signal from at least one navigation satellite;

demodulating the navigation signal by a phase at which the sensitivity of the single antenna is modulated in azimuth and determining a phase angle for the incoming signal;

determining the location of the GPS receiver;

determining the location of the one navigation satellite; and determining the vehicle attitude of the vehicle using the phase angle, the location of the GPS receiver and the location of the one navigation satellite.

2. The process of claim 1, further comprising:

using the GPS receiver to receive multiple navigation signals from multiple navigation satellites;

determining a phase angle for each of the incoming signals;

determining the location of each navigation satellite; and determining the attitude of the vehicle using the phase angles, the location of the GPS receiver and the locations of the navigation satellites.

3. The process of claim 1, the GPS receiver receiving a plurality of navigation signals, and further comprising determining if the navigation signals are coming from a wrong angle or if the navigation signals are all coming from the same angle.

4. The process of claim 1, further comprising determining the vehicle attitude of the vehicle using the phase angle, the location of the GPS receiver and the location of only the one navigation satellite.

5. The process of claim 1, further comprising determining the vehicle attitude of the vehicle using only the phase angle when the vehicle is at least one of: known to be local level given vehicle characteristics; and aided by an Inertial Measurement Unit (IMU).

6. The process of claim 1, wherein determining the vehicle attitude of the vehicle includes estimating an elevation based on an interference pattern.

7. The process of claim 1, further comprising creating an interference pattern, wherein determining the vehicle attitude of the vehicle includes using the created interference pattern.

8. The process of claim 1, further comprising determining one of the azimuth and the phase angle based on an antenna gain, an elevation of the navigation signal with respect to the vehicle, an elevation of the navigation signal with respect to the single antenna, an antenna tilt angle of the single antenna with respect to the vehicle level, an angular rate of antenna sensitivity rotation.

9. The process of claim 1, further comprising determining the azimuth when the single antenna is in a static antenna pattern.

10. The process of claim 9, further comprising determining the azimuth when the single antenna is in a static antenna pattern using a signal strength of the single antenna, a single strength of a second antenna, a gain of the single antenna, and a gain of the second antenna.

\* \* \* \* \*